United States Patent [19]

Liggett

[11] 4,172,749
[45] Oct. 30, 1979

[54] SHAPED ARTICLES FORMED FROM THERMOPLASTIC SHEETING CONTAINING SEALED PASSAGEWAYS

[75] Inventor: Joseph Liggett, New York, N.Y.

[73] Assignee: Primex Plastics Corp. subs. of ICC Industries Inc., Oakland, N.J.

[21] Appl. No.: 891,465

[22] Filed: Mar. 29, 1978

[51] Int. Cl.² .................. B29C 27/04; B32B 7/00; B32B 3/22
[52] U.S. Cl. .................. 156/244.13; 156/244.18; 156/305; 156/306; 428/119; 428/178; 428/188
[58] Field of Search ............... 428/68, 69, 119, 120, 428/166, 172, 177, 178, 188; 156/145, 147, 196, 244.18, 221, 244.13, 222, 285, 305, 306; 264/93, 96, 319, 173, 330, 177 R, 331, 209; 52/790, 791, 806, 807

[56] References Cited

U.S. PATENT DOCUMENTS

| 3,274,315 | 9/1966 | Kawamura | 428/188 |
| 3,478,553 | 11/1969 | Weglarz | 156/221 |
| 3,660,189 | 5/1972 | Troy | 156/271 |
| 3,700,523 | 10/1972 | Sato et al. | 156/285 |
| 3,821,051 | 6/1974 | Withers | 428/188 |
| 3,868,285 | 2/1975 | Troy | 428/178 |
| 3,935,357 | 1/1975 | Padovani | 428/188 |
| 4,017,351 | 4/1977 | Larson | 156/145 |

Primary Examiner—William J. Van Balen
Attorney, Agent, or Firm—Toren, McGeady and Stanger

[57] ABSTRACT

A shaped article is formed of thermoplastic sheeting which consists of a pair of sheets of thermoplastic material spaced apart and interconnected by longitudinally extending ribs. The combination of the sheets and the ribs form elongated passageways in the sheeting. Individual sections of the sheeting have the ends of the passageways sealed closed so that a gaseous medium, such as air, is trapped in the passageways. The sheeting is formed in an extrusion process with one of the sheets having a greater thickness than the other. The individual sections of the sheeting are formed into a shaped article with the sealed character of the passageways being maintained so that the sheets remain in spaced relation in the shaped sections. The difference in thickness between the sheets is selected so that, following the shaping operation, both sheets have substantially the same thickness.

6 Claims, 4 Drawing Figures

SHAPED ARTICLES FORMED FROM THERMOPLASTIC SHEETING CONTAINING SEALED PASSAGEWAYS

SUMMARY OF THE INVENTION

The present invention is directed to the formation of shaped members formed of thermoplastic material and, more particularly, to the formation of the shaped members from thermoplastic sheeting consisting of a pair of sheets or layers spaced apart and interconnected by longitudinally extending ribs so that the interior of the sheeting contains a plurality of longitudinally extending laterally closed passageways.

In the past it has been known to form thermoplastic sheeting from two layers of thermoplastic material so that closed cells or elongated chambers are formed in the sheeting. One application of such thermoplastic sheeting is the formation of cushioning material useful in packaging to prevent damage to packaged objects, note U.S. Pat. Nos. 3,660,189; 3,868,285 and 3,700,523. Ribbed laminated structures have also been known containing elongated ducts or passageways and have been used as packaging, as insulation, and as heat exchangers, see U.S. Pat. No. 3,821,051. While it has been known in the prior art to form closed cells in a laminated thermoplastic structure or to provide such laminated structures with elongated passageways, there has been no suggestion of the use of such laminated structures for forming shaped articles where the passageways retain their character following the shaping operation.

Therefore, it is the primary object of the present invention to provide a rigid shaped member formed of thermoplastic sheeting and a method of making the member where the interior of the member is formed by a plurality of separate elongated passageways containing a gaseous medium, such as air.

In accordance with the present invention, a thermoplastic sheeting is extruded consisting of a first planar sheet and a second planar sheet arranged in substantially parallel relationship with the sheets being spaced apart and interconnected by longitudinally extending ribs. The combination of the sheets and the ribs form a plurality of elongated laterally closed passageways. A gaseous medium, such as air, is admitted into the passageways. Subsequently, the ends of the passageways are sealed with the gaseous medium retained in them. Individual sections of the thermoplastic sheeting with the ends of the passageways sealed, are formed into a rigid shaped member or article with the ends of the passageways remaining sealed and retaining the gaseous medium. After the shaped forming, due to the trapped gaseous medium, the sheets are still in spaced relation. Furthermore, initially, the sheets can each be formed with a different thickness dimension so that, in the formation of a shaped article, the sheets in the deformed regions of the article have approximately the same thickness dimension.

Various sealing operations can be used for closing the ends of the passageways, such as, taping the ends closed, electronically sealing the ends, thermally sealing the ends, or melting the ends with a solvent so that they become sealed.

The present invention is applicable to all extrudable thermoplastic materials. The thermoplastic sheeting embodying the present invention has excellent strength versus weight ratios. Moreover, the air or other gaseous medium sealed in the passageways, affords excellent insulating values for both temperature and noise.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
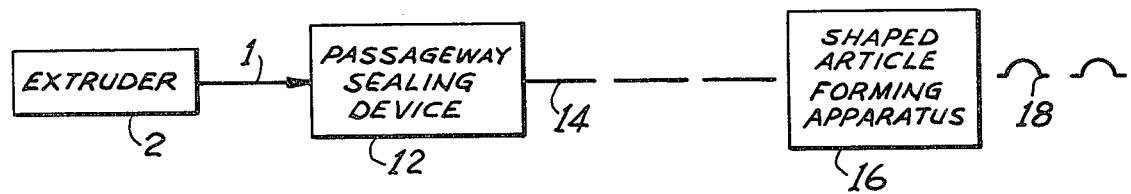
FIG. 1 is a diagrammatic view of the operations performed in producing a shaped article embodying the present invention.

In forming a rigid shaped article in accordance with the present invention, initially thermoplastic sheeting 1 is extruded from an extruder 2. Conventional extruding equipment is used and the sheeting consists of a first planar sheet 4 and a second planar sheet 6 with the inwardly facing surfaces of the two sheets integrally interconnected by a plurality of longitudinally extending ribs 8. Within the sheeting the combination of the inwardly facing surfaces of the sheets 4, 6 and the adjacent surfaces of a pair of ribs 8 define elongated ducts or passageways 10. During extrusion, the ends of the passageways 10 are left open so that air or another gaseous medium is admitted into the passageways. All thermoplastic materials, including the following, can be used for forming the sheeting: polypropylene, filled polypropylene (filled with materials like talc or CA CO$_3$), polyethylene, ABS, polystyrene, acrylic and polycarbonate.

After the sheeting 1 leaves the extruder it is cut into sections of desired length for forming a shaped article and the opposite ends of the passageways 10 are sealed. As shown in FIG. 1, the extruded sheeting 2 enters a passageway sealing device 12 where the sheeting is cut to a desired length and the open ends of the passageways 10 are sealed. Various conventional sealing procedures can be used including any one of the following:

(a) By sealing the open ends of the passageways with an air-tight tape. The tape is sealed to the first and second sheets 4, 6 and extends transversely across the ribs 8.

(b) By electronically sealing the ends of the passageways.

(c) By thermally sealing the ends of the passageways, such as by directing the open ends between thermally heated nip bars.

(d) By immersing the ends of the section of sheeting containing the openings to the passageways in a solvent for melting the thermoplastic so that the melted material forms a seal closure for the open ends of the passageways.

Individual sections 14 of the sheeting with the ends of the passageways sealed, exit from the device 12 and are conveyed to a shaped article forming apparatus 16. Various forming apparatuses can be used depending on the type of thermoplastic material involved its dimensions, and the form to be imparted to the shaped article. As can be seen in FIG. 1, shaped articles 18 are discharged from the apparatus 16. Possible types of forming apparatus include apparatus employing a vacuum, compressed air, or combinations of compressed air, vacuum and mechanical assists. Such apparatus are conventional and do not form a part of the present invention.

Figure 2:
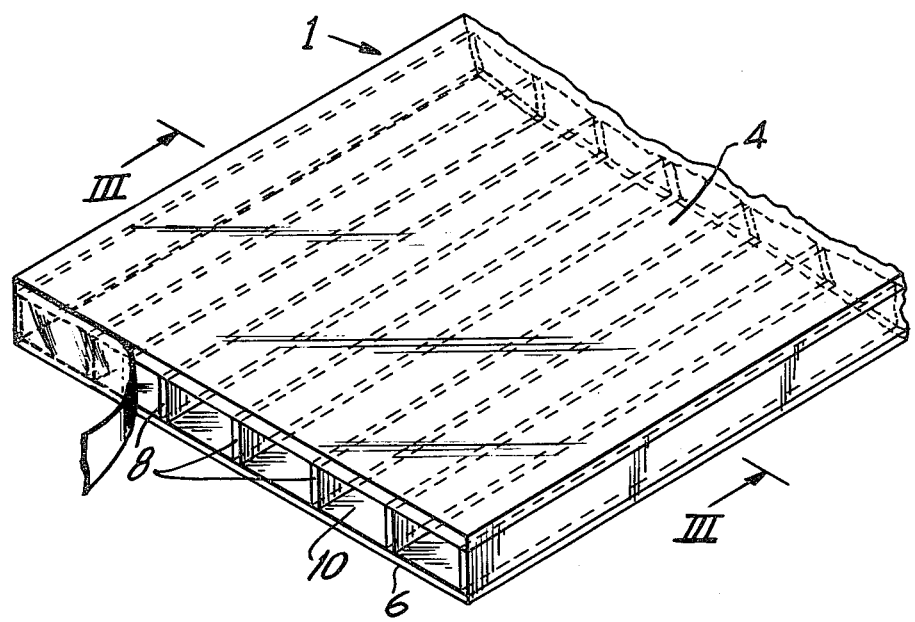
FIG. 2 is a perspective view of a portion of the thermoplastic sheeting formed in accordance with the present invention.
Figure 3:
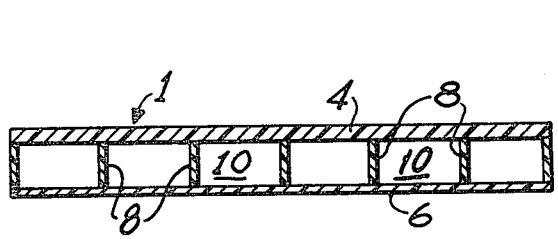
FIG. 3 is a sectional view taken along the line III—III in FIG. 2.
Figure 4:
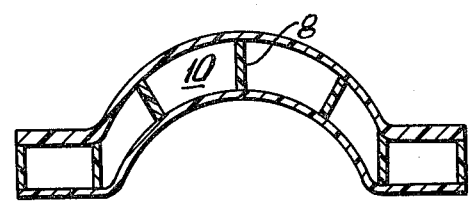
FIG. 4 is a sectional view through a shaped article embodying the present invention.

During the forming operation, at least a portion of the first and second sheets 4 and 6 of each sheeting section 14 are deformed from the original planar condition of the sheeting as shown in FIGS. 2 and 3. During the forming step, the gaseous medium within the passageways transmits the forming force to all surfaces while the gaseous medium is retained within the section. In the forming operation, the gaseous medium is heated and expands exerting a uniform pressure. Preferably, one of the first and second sheets is formed with a greater thickness dimension than the other, for instance, in FIG. 3 the first sheet 4 is shown as being thicker than the second sheet 6. This dimensional feature permits the thicker sheet to absorb the exerted pressure of the trapped air while the forming pressure is applied to the thinner sheet. The forming operation can cause a thinning of the first sheet relative to the second sheet.

Furthermore, the thickness differential in the first and second sheets 4,6, permits the formation of the shaped article so that the deformation of the thicker sheet, which may tend to cause it to become thinner, assures that the two sheets forming the opposite surfaces of the shaped article have the same thickness at the completion of forming the shaped section. Accordingly, the final article has adequate strength and the thinning which may occur in at least one of the sheets during the forming operation does not have a harmful effect on the article.

While specific embodiments of the invention have been shown and described in detail to illustrate the application of the inventive principles, it will be understood that the invention may be embodied otherwise without departing from such principles.

I claim:

1. Method of forming a rigid shaped article of thermoplastic material comprising extruding thermoplastic sheeting including a first planar sheet and a second planar sheet disposed in substantially parallel spaced relation to one another and with laterally spaced coextending ribs extending between the first and second sheets and forming in combination with the sheets a plurality of elongated laterally closed passageways through the sheeting, cutting the sheeting to a desired length with the first and second sheets in planar relation, admitting a gaseous medium into the passageways in the cut length of sheeting, sealing the opposite ends of the passageways in the cut length of sheeting for retaining the gaseous medium therein so that each passageway forms a sealed chamber containing the gaseous medium, and deforming at least a portion of the area of the cut length of sheeting from its original planar relation into a shaped article while heating the trapped gaseous medium so that in the shaped portion deformed out of the original planar relation the passageways remain sealed retaining the gaseous medium therein and maintaining the first and second sheets in substantial parallel spaced relation.

2. Method, as set forth in claim 1, including extruding the thermoplastic sheeting with one of the first and second sheets being thicker than the other, and deforming the shaped portion of the shaped article so that subsequent to deformation the first and second sheets have approximately the same thickness dimension in the shaped portion.

3. Method, as set forth in claim 1, including the step of sealing the ends of the passageways in the sheeting by applying an air-tight tape to each end of the cut length of sheeting with the tape extending transversely across the ends of the passageways through the cut length of the sheeting.

4. Method, as set forth in claim 1, including the step of sealing the ends of the passageways in the cut length of sheeting by electronically sealing the ends.

5. Method, as set forth in claim 1, including the step of sealing the ends of the passageways in the cut length of sheeting by thermally sealing the ends.

6. Method, as set forth in claim 1, including the step of sealing the ends of the passageways in the cut length of sheeting by immersing the ends of the cut length of sheeting in a solvent for melting the plastic material forming the sheeting.

* * * * *